US007614229B2

(12) United States Patent
Irisawa et al.

(10) Patent No.: US 7,614,229 B2
(45) Date of Patent: Nov. 10, 2009

(54) CONTROL SYSTEM FOR SUPERCHARGED INTERNAL COMBUSTION ENGINE

(75) Inventors: Yasuyuki Irisawa, Susono (JP);
Hirofumi Kubota, Mishima (JP);
Toshihiko Tanaka, Suntou-gun (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 251 days.

(21) Appl. No.: 11/666,441

(22) PCT Filed: May 19, 2006

(86) PCT No.: PCT/JP2006/010500

§ 371 (c)(1),
(2), (4) Date: Apr. 27, 2007

(87) PCT Pub. No.: WO2006/123836

PCT Pub. Date: Nov. 23, 2006

(65) Prior Publication Data

US 2008/0022678 A1    Jan. 31, 2008

(30) Foreign Application Priority Data

May 20, 2005    (JP)    ............................. 2005-147975

(51) Int. Cl.
*F02D 23/00* (2006.01)
(52) U.S. Cl. ........................................ 60/602; 60/605.1
(58) Field of Classification Search ................... 60/602, 60/605.1
See application file for complete search history.

(56) References Cited

U.S. PATENT DOCUMENTS

| 4,444,012 A | * | 4/1984 | Gauffres ...................... 60/602 |
| 6,018,949 A |   | 2/2000 | Broesecke et al. |
| 6,272,860 B1 | * | 8/2001 | Klein et al. .................. 60/602 |
| 7,343,743 B2 | * | 3/2008 | Dismon et al. ............. 60/605.2 |
| 2007/0089400 A1 | * | 4/2007 | Huang ......................... 60/284 |

FOREIGN PATENT DOCUMENTS

| DE | 199 55 090 | 5/2001 |
| EP | 1 394 393 | 3/2004 |
| JP | 5 321643 | 12/1993 |
| JP | 2001 107722 | 4/2001 |

(Continued)

*Primary Examiner*—Hoang M Nguyen
(74) *Attorney, Agent, or Firm*—Oblon, Spivak, McClelland, Maier & Neustadt, L.L.P.

(57) ABSTRACT

A control system for a supercharged internal combustion engine provided with a main exhaust passage (20) extending through a turbocharger turbine (21) and further through a catalyst (23, 24) to open to the outside air, an exhaust bypass passage (25) by passing the turbocharger turbine by branching from the main exhaust passage at the upstream side of the turbine and merging with the main exhaust passage before reaching the catalyst at the turbine downstream side, and an exhaust bypass valve (26) provided at the exhaust bypass passage, the control system for a supercharged internal combustion engine controlling the ignition timing in accordance with at least one of the engine warmup state and the catalyst warmup state until warmup of the internal combustion engine and warmup of the catalyst are completed and further controlling the opening degree of the exhaust bypass valve based on the control of the ignition timing, is provided.

12 Claims, 7 Drawing Sheets

FOREIGN PATENT DOCUMENTS

| | | |
|---|---|---|
| JP | 2001 227395 | 8/2001 |
| JP | 2001 271685 | 10/2001 |
| JP | 2002 364503 | 12/2002 |
| JP | 2005 256691 | 9/2005 |
| WO | 91 16529 | 10/1991 |

* cited by examiner

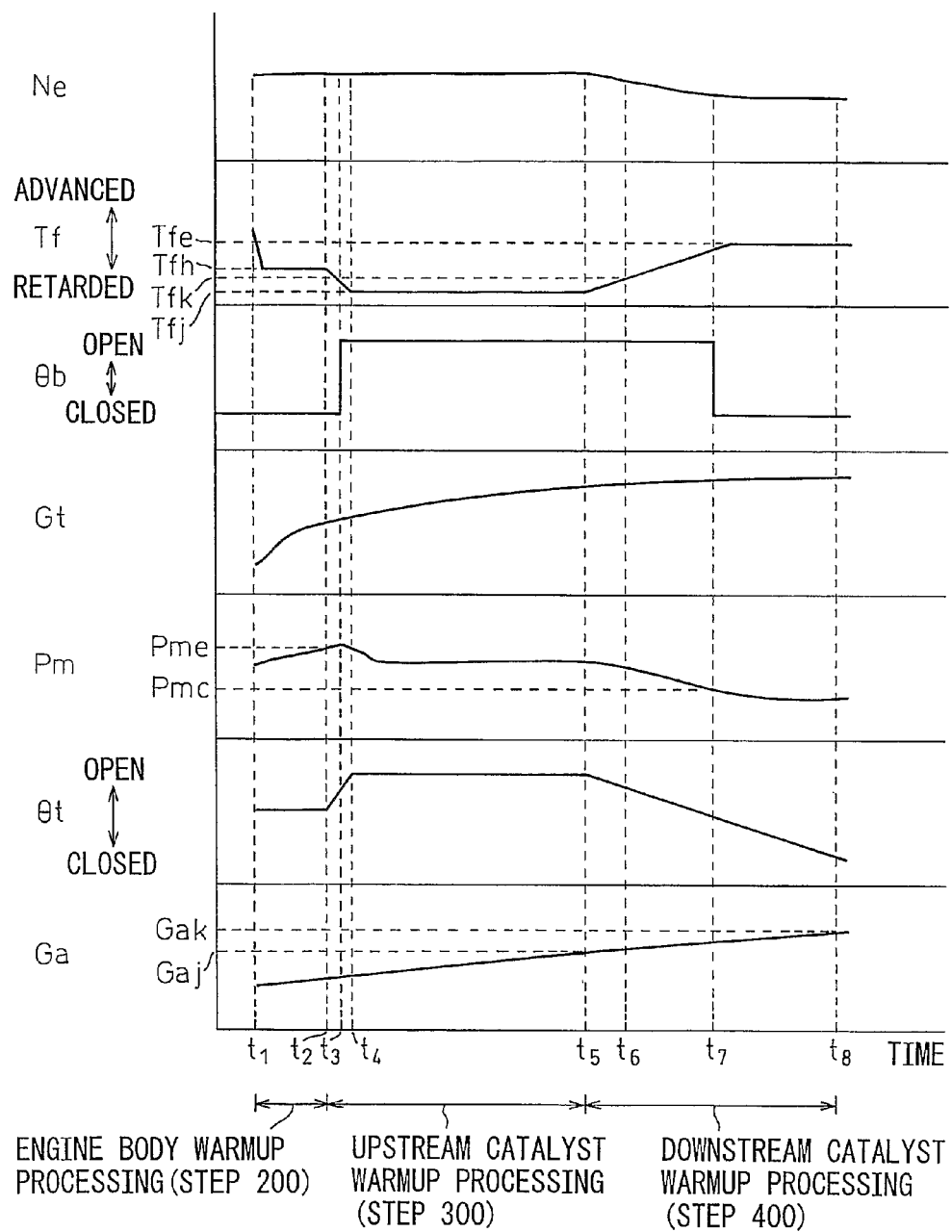

CONTROL SYSTEM FOR SUPERCHARGED INTERNAL COMBUSTION ENGINE

TECHNICAL FIELD

The present invention relates to a control system for a supercharged internal combustion engine.

BACKGROUND ART

In a supercharged internal combustion engine, in general, a turbocharger turbine is arranged in the exhaust passage at the upstream side from the catalyst, so the length of the exhaust passage from the exhaust port to the catalyst of the internal combustion engine becomes longer than that of a natural intake type internal combustion engine. Further, due to the increase in length of the exhaust passage and the presence of the turbocharger, the heat capacity of the exhaust system increases and the heat radiating surface area increases. For this reason, in a supercharged internal combustion engine, the temperature of the exhaust gas from the internal combustion engine ends up dropping until reaching the catalyst. In particular, after the cold start of an internal combustion engine, it takes time for the catalyst to warm up (that is, for the temperature of the catalyst to rise to the activated temperature), so deterioration of exhaust emission is liable to occur.

Further, as a method for dealing with this problem, a method is known of providing an exhaust bypass passage for bypassing the turbocharger turbine and an exhaust bypass valve opening/closing the exhaust bypass passage and, when the catalyst should be warmed up, making the exhaust gas bypass the turbocharger turbine so as to feed high temperature exhaust gas to the catalyst (for example, see Japanese Patent Publication (A) No. 2001-107722).

DISCLOSURE OF THE INVENTION

However, when the exhaust gas bypasses the turbocharger turbine in this way, the residence time of the exhaust gas until reaching the catalyst is shortened, so the afterburning of the exhaust gas (more specifically, burning of the hydrocarbons included in the exhaust gas inside the exhaust passage) is not sufficient, the amount of the hydrocarbons (HC) in the exhaust gas reaching the catalyst becomes greater and, as a result, the emission ends up deteriorating.

The present invention was made in consideration of this problem and has as its object the provision of a control system for a supercharged internal combustion engine which makes the exhaust gas bypass the turbocharger turbine to promote warmup of the catalyst, the control system for a supercharged internal combustion engine being able to suppress deterioration of emission while promoting early warmup of the catalyst.

The present invention, as a means for solving the above problem, provides a control system for a supercharged internal combustion engine described in the claims.

In a first aspect of the invention, there is provided a control system for a supercharged internal combustion engine provided with a main exhaust passage extending from an exhaust port of the internal combustion engine through a turbocharger turbine and further through a catalyst to open to the outside air, an exhaust bypass passage bypassing the above turbocharger turbine by branching from the above main exhaust passage at the upstream side of the turbine and merging with the main exhaust passage before reaching the catalyst at the turbine downstream side, and an exhaust bypass valve provided at the above exhaust bypass passage, the control system for a supercharged internal combustion engine controlling the ignition timing in accordance with at least one of the engine warmup state and the catalyst warmup state until warmup of the above internal combustion engine body and warmup of the above catalyst are completed and further controlling the opening degree of the exhaust bypass valve based on the control of the ignition timing.

Further, in a second aspect of the invention, there is provided the first aspect of the invention wherein the exhaust bypass valve is opened to warm up the catalyst when the ignition timing of the internal combustion engine is retarded to, or more than, a predetermined ignition timing.

When the above exhaust bypass valve opens, high temperature exhaust gas is supplied to the catalyst and the temperature of the catalyst is made to rise but, as the residence time of the exhaust gas until reaching the catalyst is shortened, the afterburning of the exhaust gas is not sufficient, the amount of hydrocarbons (HC) in the exhaust gas reaching the catalyst increases and, as a result, the emission ends up deteriorating in some cases. On the other hand, if the ignition timing is retarded, the temperature of the exhaust gas rises and the afterburning is promoted, so the difference of the amount of hydrocarbons (HC) in the exhaust gas reaching the catalyst due to the opening/closing state of the exhaust bypass valve gradually becomes smaller as the ignition timing is retarded. When the ignition timing is retarded to, or more than, a certain ignition timing, the amount of the hydrocarbons (HC) is not affected by the opening/closing state of the exhaust bypass valve. However, in general, if the ignition timing of the internal combustion engine is retarded, the combustion becomes unstable. Further, if the internal combustion engine is not yet warmed up, retardation of the ignition timing easily causes misfires and easily causes deterioration of the combustion.

From the above, according to the first and second aspects of the invention, it becomes possible to suppress deterioration of combustion, suppress deterioration of emission, and promote early warmup of the catalyst. Further, in particular, in the second aspect of the invention, when the above predetermined ignition timing is set equal to or at the retarded side more than the ignition timing where the amount of the hydrocarbons (HC) is no longer affected by the opening/closing state of the exhaust bypass valve, such deterioration of emission can be reliably suppressed. That is, in this case, even if the above exhaust bypass valve is opened and the residence time of the exhaust gas reaching the catalyst is shortened, the afterburning of the exhaust gas is sufficient, the amount of hydrocarbons (HC) in the exhaust gas reaching the catalyst does not become greater and, as a result, the above deterioration of emission no longer occurs.

According to a third aspect of the present invention, there is provided a control system for a supercharged internal combustion engine provided with a main exhaust passage extending from an exhaust port of the internal combustion engine through a turbocharger turbine and further through a catalyst to open to the outside air, an exhaust bypass passage bypassing the above turbocharger turbine by branching from the above main exhaust passage at the upstream side of the turbine and merging with the main exhaust passage before reaching the catalyst at the turbine downstream side, and an exhaust bypass valve to open and close the exhaust bypass passage by opening and closing, the control system for a supercharged internal combustion engine opening the exhaust bypass valve to warm up the catalyst after startup of the internal combustion engine when the ignition timing of the internal combustion engine is retarded to, or more than, a predetermined ignition timing.

As explained above, when opening the above exhaust bypass valve, the high temperature exhaust gas is supplied to the catalyst and a rise in temperature of the catalyst is promoted, but the amount of hydrocarbons (HC) in the exhaust gas reaching the catalyst increases and, as a result, the emission ends up deteriorating in some cases. On the other hand, if retarding the ignition timing, the difference in the amount of hydrocarbons (HC) in the exhaust gas reaching the catalyst due to the opening/closing state of the above exhaust bypass valve gradually becomes smaller. When the ignition timing is retarded to, or more than, a certain ignition timing, the amount of the hydrocarbons (HC) is no longer affected by the opening/closing state of the above exhaust bypass valve.

Due to this, according to the third aspect of the present invention, by suitably setting the above predetermined ignition timing, it is possible to suppress the deterioration of emission and promote early warmup of the catalyst. Further, in particular, when setting the above predetermined ignition timing equal to or at the retarded side more than the ignition timing where the amount of hydrocarbons (HC) is no longer affected by the opening/closing state of the above exhaust bypass valve, it is possible to reliably suppress the above deterioration of emission. That is, in this case, even if opening the above exhaust bypass valve and the residence time of the exhaust gas until it reaches the catalyst is shortened, afterburning of the exhaust gas is sufficient, the amount of hydrocarbons (HC) in the exhaust gas reaching the catalyst does not increase, and as a result the above deterioration of emission no longer occurs.

In a fourth aspect of the present invention, there is provided the second or third aspect of the invention wherein, from the start of the above internal combustion engine to when the internal combustion engine becomes a predetermined engine warmup state, the above ignition timing is made a timing advanced more than the above predetermined ignition timing.

In a fifth aspect of the present invention, there is provided any of the second to fourth aspects of the invention wherein, after the start of the internal combustion engine and the internal combustion engine body is in a predetermined engine warmup state, the above ignition timing is retarded to, or more than, the above predetermined ignition timing and the above exhaust bypass valve is opened.

As explained above, in general, when the ignition timing of the internal combustion engine is retarded, combustion becomes unstable. Further, if the internal combustion engine is not yet warmed up, the retardation of the ignition timing easily causes misfires and easily causes deterioration of the combustion. Due to this, according to the fourth and fifth aspects of the invention, by suitably setting the above predetermined engine warmup state, it is possible to reliably suppress deterioration of combustion, suppress deterioration of emission and promote early warmup of the catalyst.

According to the sixth aspect of the present invention, there is provided any of the first, second, fourth, and fifth aspects of the invention wherein the engine warmup state of the internal combustion engine body is judged based on the intake pressure.

If the temperature of the internal combustion engine body rises, the temperature of the exhaust gas rises. If the temperature of the exhaust gas rises, the rotational speed of the turbocharger turbine rises. If the rotational speed of the turbocharger turbine rises, the intake pressure rises. Due to this, according to the sixth aspect of the present invention, by using the intake pressure, it is possible to easily and accurately judge the engine warmup state of the internal combustion engine body.

In a seventh aspect of the present invention, there is provided any of the first to sixth aspects of the invention wherein the exhaust bypass valve opened to warm up the catalyst is closed after making the intake pressure a predetermined intake pressure or less.

When the exhaust bypass valve is closed, the amount of the exhaust gas supplied to the turbocharger turbine is increased, so the rotational speed of the turbine rises. For this reason, when the above exhaust bypass valve is closed, the intake pressure rapidly rises and torque shock ends up occurring in some cases. On the other hand, if making the intake pressure sufficiently low, even if the rotational speed of the turbine rises, the intake pressure is not affected much. As a result, the torque is also not affected much.

Due to this, according to the seventh aspect of the invention, by suitably setting the predetermined intake pressure, it is possible to suppress torque shock due to closing of the exhaust bypass valve.

BRIEF DESCRIPTION OF THE DRAWINGS

These and other objects and features of the present invention will become clearer from the following description of the preferred embodiments given with reference to the attached drawings, wherein:

FIG. 7 shows an example of the changes over time of the engine rotational speed Ne, ignition timing Tf, exhaust bypass valve opening degree (or opening/closing state) θb, exhaust gas temperature Gt, intake pressure Pm, throttle valve opening degree θt, and cumulative value Ga of the amount of intake air, in the case of executing the warmup control shown in the flow chart of FIG. 3.

BEST MODES FOR CARRYING OUT THE INVENTION

Figure 1:
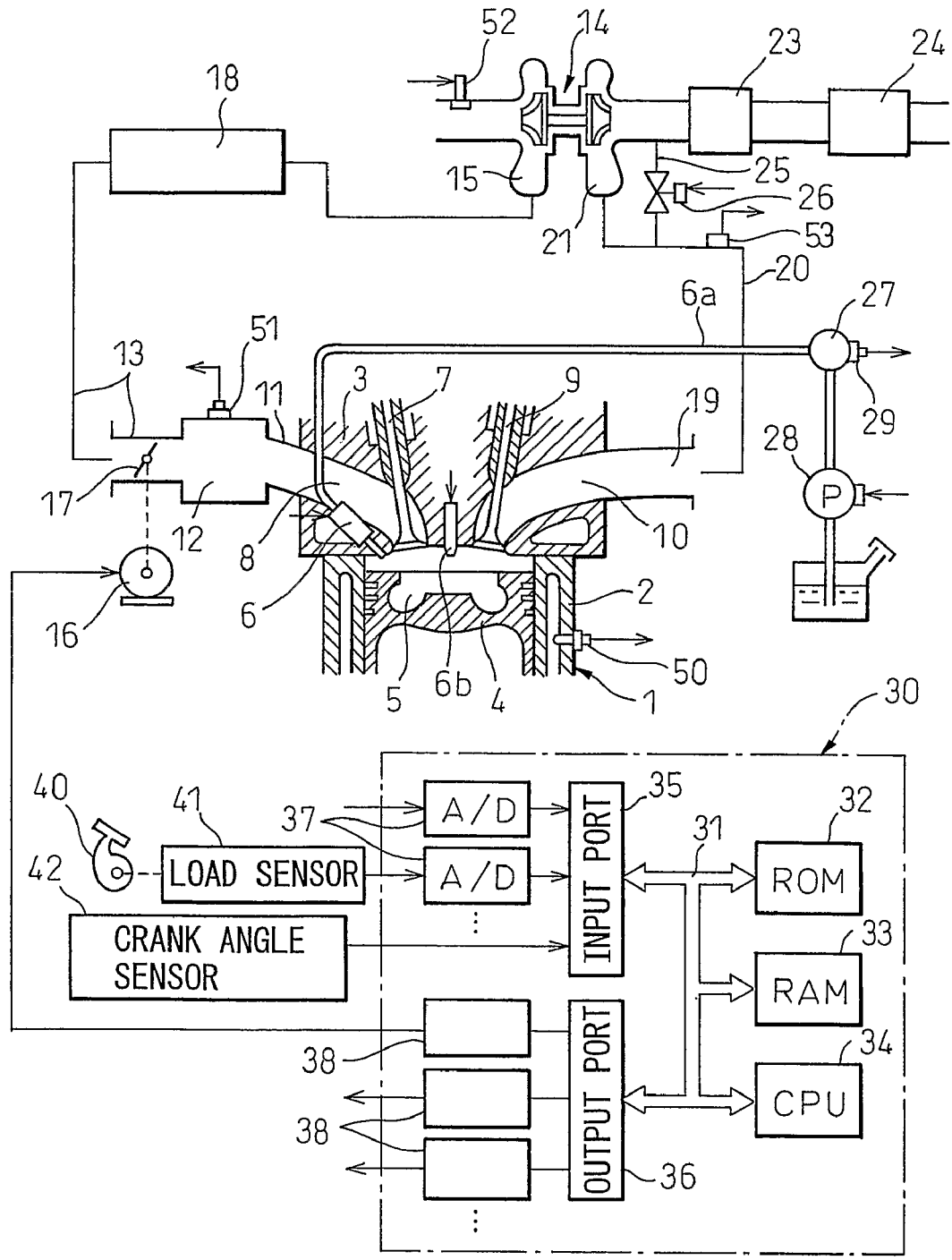
FIG. 1 is an explanatory view showing the overall configuration of an internal combustion engine using a control system for a supercharged internal combustion engine of an embodiment of the present invention.

Preferred embodiments of the present invention will be described in detail below while referring to the attached figures. FIG. 1 is an explanatory view of the overall configuration of an internal combustion engine using a control system for a supercharged internal combustion engine of an embodiment of the present invention. Note that the illustrated internal combustion engine is a gasoline engine of a direct injection type (a type which directly injects fuel into combustion chambers). However, the present invention, for example, can also be applied to a gasoline engine or other internal combustion engine of a port injection type (type injecting fuel into intake ports).

In FIG. 1, 1 indicates an engine body, 2 indicates a cylinder block, 3 indicates a cylinder head, 4 indicates a piston, 5 indicates a combustion chamber, 6 indicates an electric control type fuel injector, 6b indicates a spark plug, 7 indicates an intake valve, 8 indicates an intake port, 9 indicates an exhaust valve, and 10 indicates an exhaust port. The cylinder block 2 is provided with a cooling water temperature sensor 50 for detecting the temperature of the cooling water for cooling the internal combustion engine.

Each intake port 8 is connected through a corresponding intake tube 11 to a surge tank 12. The surge tank 12 is connected through an intake pipe 13 to a compressor 15 of a turbocharger (exhaust-turbocharger) 14. The surge tank 12 is provided with an intake pressure sensor 51 for detecting the intake pressure of the internal combustion engine. Further, the intake pipe 13 at the upstream side of the above compressor 15 is provided with an air flow meter 52 for detecting the amount of air taken into the combustion chamber 5 (amount of intake air).

Inside the intake pipe 13 is arranged a throttle valve 17 driven by a step motor 16. Further, around the intake pipe 13 is arranged a cooling system 18 for cooling the intake air flowing through the inside of the intake pipe 13. In the internal combustion engine shown in FIG. 1, engine cooling water is led into the cooling system 18. This engine cooling water is used to cool the intake air. On the other hand, the exhaust port 10 is connected through an exhaust manifold 19 and exhaust pipe 20 to a turbine 21 of the turbocharger 14. The outlet of the turbine 21 is connected through the exhaust pipe 20 to an upstream three-way catalyst 23 and downstream three-way catalyst 24 (hereinafter referred to as simply the "upstream catalyst 23" and "downstream catalyst 24"). The exhaust pipe 20 at the upstream side of the turbine 21 is provided with an oxygen concentration sensor (or air-fuel ratio sensor) 53 for detecting the air-fuel ratio.

Further, as shown in FIG. 1, a bypass pipe 25 is branched from the exhaust pipe 20 at the upstream side of the turbine 21. This bypass pipe 25 is merged with the exhaust pipe 20 before reaching the upstream catalyst 23 at the downstream side of the turbine 21. That is, the bypass pipe 25 is provided so as to enable the exhaust gas to bypass the above turbine 21. The bypass pipe 25 is provided with an exhaust bypass valve 26 having the function of a supercharging pressure control valve. By operating this, the exhaust gas passing through the bypass pipe 25 can be controlled.

Note that, as is clear from the above explanation, the exhaust system of the internal combustion engine in the present embodiment is comprised of a main exhaust passage running from an exhaust port 10 through a turbine 21 of a turbocharger 14 and further through catalysts (upstream and downstream catalysts 23 and 24) to open to the outside air, an exhaust bypass passage bypassing the turbine 21 of the above turbocharger 14 by branching from the above main exhaust passage at the turbine upstream side and merging with the main exhaust passage before reaching the upstream catalyst 23 at the turbine downstream side, and an exhaust bypass valve 26 opening and closing to open and close the above exhaust bypass passage.

On the other hand, each fuel injector 6 is connected through a fuel pipe 6a to a fuel reservoir, that is, a so-called delivery pipe 27. The delivery pipe 27 is supplied with fuel from an electric control type variable discharge fuel pump 28. The fuel supplied to the delivery pipe 27 is supplied through each fuel pipe 6a to each fuel injector 6. The delivery pipe 27 is provided with a fuel pressure sensor 29 for detecting the fuel pressure in the delivery pipe 27. The discharge of the fuel pump 28 is controlled based on the output signal of the fuel pressure sensor 29 so that the fuel pressure in the delivery pipe 27 becomes the target fuel pressure.

The electronic control unit 30 is comprised of a digital computer comprising components connected by a bidirectional bus 31, that is, a read only memory (ROM) 32, random access memory (RAM) 33, microprocessor (CPU) 34, input port 35, and output port 36. The fuel pressure sensor 29, cooling water temperature sensor 50, intake pressure sensor 51, air flow meter 52, and oxygen concentration sensor (or air-fuel ratio sensor) 53 output signals which are input through the corresponding AD converters 37 to the input port 35.

The acceleration pedal 40 is connected to a load sensor 41 generating an output voltage proportional to the amount of depression of the acceleration pedal 40. The load sensor 41 outputs a voltage which is input through the corresponding AD converter 37 to the input port 35. Further, the input port 35 is connected to a crank angle sensor 42 which generates an output pulse every time the crankshaft, for example, rotates by 15°. On the other hand, the output port 36 is connected through the corresponding drive circuits 38 to the fuel injector 6, spark plug 6b, throttle valve drive step motor 16, exhaust bypass valve 26, and fuel pump 28.

However, in a supercharged internal combustion engine, in general, as shown in FIG. 1, a turbocharger turbine is arranged at an upstream side from the catalyst, so the length of the exhaust passage from the exhaust port of the internal combustion engine to the catalyst becomes longer than a natural intake type internal combustion engine. Further, due to the increase in exhaust passage length and presence of the turbocharger, the heat capacity of the exhaust system increases and the heat radiating surface area increases. For this reason, in a supercharged internal combustion engine, the temperature of the exhaust gas from the internal combustion engine falls before reaching the catalyst. In particular, right after cold start up of the internal combustion engine, it takes a long time for the catalysts to warm up (that is, for the temperature of the catalysts to rise to the activation temperature) and, therefore, deterioration of the exhaust emission is liable to be caused.

Further, to deal with this problem, when having the configuration shown in FIG. 1, that is, when an exhaust bypass passage for bypassing the turbocharger turbine and an exhaust bypass valve for opening and closing the exhaust bypass passage are provided, when warming up the catalysts, sometimes the exhaust gas is made to bypass the turbocharger turbine so as to supply high temperature exhaust gas to the catalyst for early warmup of the catalysts.

However, by making the exhaust gas bypass the turbocharger turbine in this way, the residence time of the exhaust gas until reaching the catalysts is shortened, so the afterburning of the exhaust gas (more specifically, the burning of the hydrocarbons included in the exhaust gas inside the exhaust passage) is not sufficient, the amount of the hydrocarbons (HC) in the exhaust gas reaching the catalysts becomes greater, and as a result the emission sometimes ends up deteriorating.

Therefore, in the present embodiment, in view of this point, after engine startup, the catalysts are warmed up by the control explained below to suppress deterioration of emission and promote early warmup of the catalysts. This control utilizes the fact that the ignition timing Tf of the internal combustion engine, the amount of hydrocarbons (HC) Qhc in the exhaust gas (more specifically, the amount of HC in the exhaust gas at the time of reaching the catalysts) and the opening/closing state of the above exhaust bypass valve 26 are in the relationship shown in FIG. 2.

Figure 2:
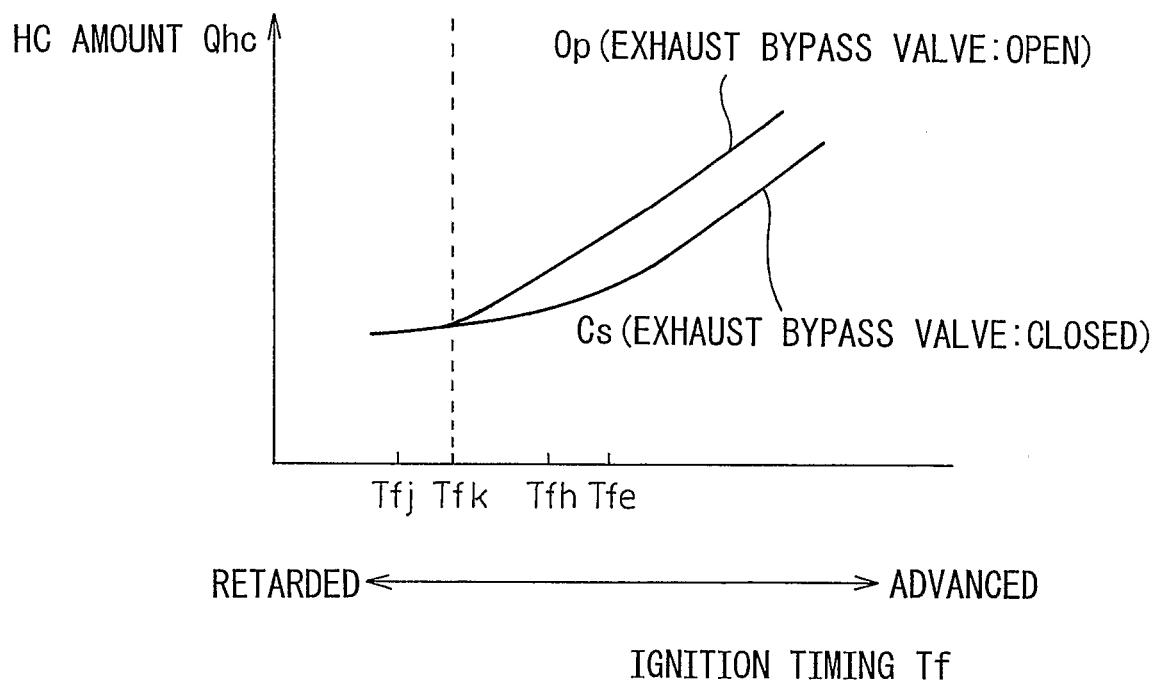
FIG. 2 is a view of the relationship of the ignition timing Tf of an internal combustion engine, the amount of hydrocarbons (HC) Qhc in the exhaust gas (more specifically, the amount of HC in the exhaust gas at the point of time when reaching the catalyst), and the opening/closing state of the exhaust bypass valve.

FIG. 2 shows the relationship of these with the abscissa showing the above ignition timing Tf and the ordinate showing the amount of HC Qhc. In the figure, the curve Op shows the case where the above exhaust bypass valve 26 is open, while the curve Cs shows the case where the above exhaust bypass valve 26 is closed. Referring to this figure, it is learned that if retarding the ignition timing Tf, the difference in the amount of HC Qhc due to the opening/closing state of the exhaust bypass valve 26 gradually becomes smaller. Further, in particular, when the ignition timing Tf is retarded to, or more than, the ignition timing Tfk, the above amount of HC Qhc is no longer affected by the opening/closing state of the above exhaust bypass valve 26.

This happens because if retarding the ignition timing Tf, the temperature of the exhaust gas rises resulting in the promotion of the above afterburning. In particular, if the ignition timing Tf is retarded to, or more than, the above ignition timing Tfk, even if the above exhaust bypass valve 26 is opened and the residence time of the exhaust gas up to the catalysts is shortened, afterburning of the exhaust gas is sufficient and the amount of HC Qhc does not become more than the case where the exhaust bypass valve 26 is closed.

As a result, if the ignition timing Tf is equal to, or at the retarded side more than, the ignition timing Tfk, even if the above exhaust bypass valve 26 is opened, the above amount of HC Qhc does not increase. Therefore, the above-mentioned deterioration of emission no longer occurs.

Due to this, if the ignition timing Tf can be retarded to or more than the ignition timing Tfk, by retarding the ignition timing Tf to, or more than, the ignition timing Tfk, then opening the exhaust bypass valve 26, the above-mentioned deterioration of emission can be reliably suppressed and the catalysts can be warmed up early.

Figure 3:
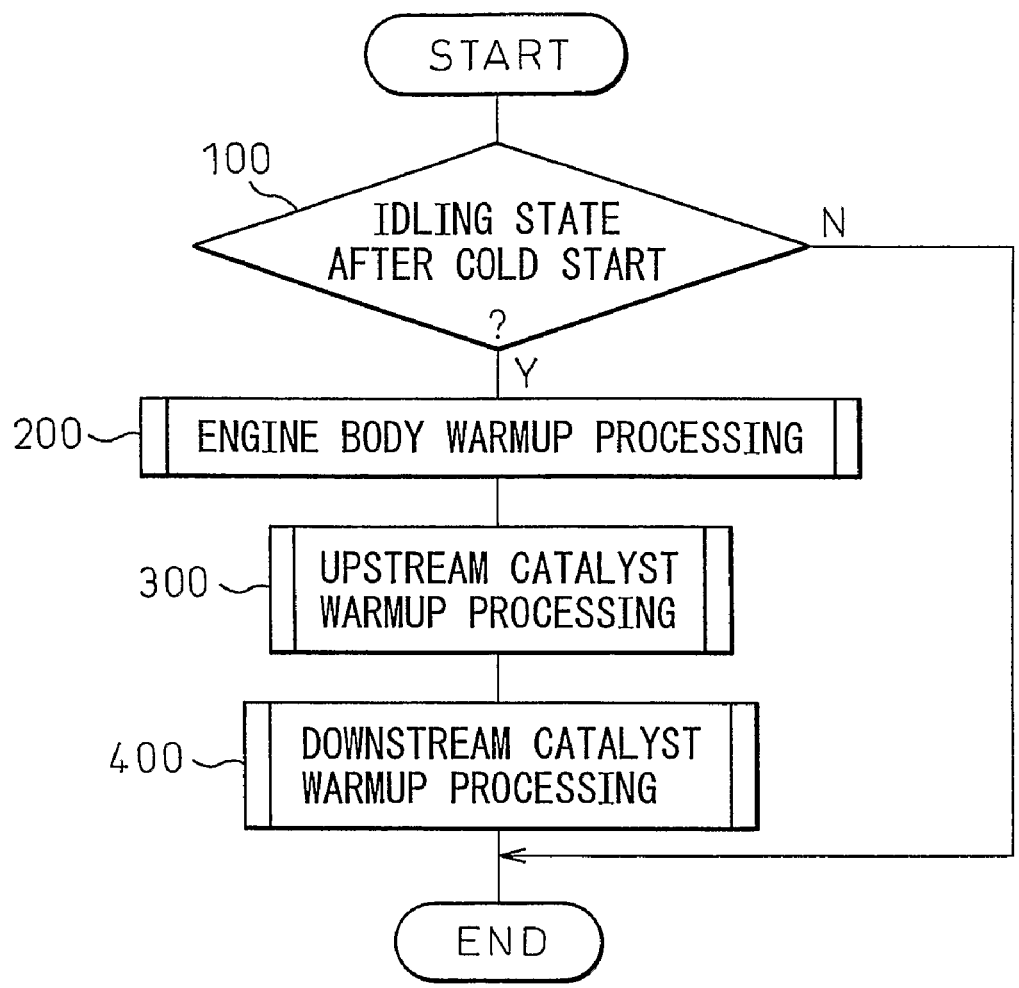
FIG. 3 is a flow chart of a control routine of the warmup control as a whole executed in an embodiment of the present invention.

Next, the warmup control executed in the present embodiment will be explained in detail. FIG. 3 is a flow chart of a control routine of the warmup control as a whole executed in the present embodiment. This control routine is started together with an engine start up. When this control routine starts, first, at step 100, it is judged if the internal combustion engine is in an idling state after start up from a cold state (that is, after cold start). More specifically, in the present embodiment, for this judgment, it is judged if the engine cooling water temperature Tw is a predetermined reference cooling water temperature Tc or less and if the amount of depression L of the acceleration pedal 40 is a predetermined reference amount of depression Lc or less. That is, if it is judged if the engine cooling water temperature Tw is the predetermined reference cooling water temperature Tc or less and the amount of depression L of the acceleration pedal 40 is the predetermined reference amount of depression Lc or less, it is judged that the internal combustion engine is in the idling state after cold start.

It if is judged at step 100 that the internal combustion engine is not in the idling state after cold start, the control routine ends. On the other hand, if it is judged at step 100 that the internal combustion engine is in the idling state after cold start, the routine proceeds to step 200. At step 200, processing is executed for warming up the engine body (engine body warmup processing). This is performed as preparation as it is necessary to later greatly retard the ignition timing (specifically, at the later step 300).

That is, as explained above, if retarding the ignition timing Tf to, or more than, the above ignition timing Tfk, then by opening the exhaust bypass valve 26, the above amount of HC Qhc does not increase, the above deterioration of emission can be reliably suppressed, and the catalysts can be warmed up early. However, in general, if the ignition timing of the internal combustion engine is retarded, the combustion becomes unstable. Further, if the engine body is not yet warmed up, the retardation of the ignition timing easily causes misfires and easily causes deterioration of combustion. Further, retarding the ignition timing Tf to, or more than, the above ignition timing Tfk usually means a considerably large retardation of the ignition timing, so if it is performed in the state where the engine body is not yet warmed up, misfires occur and combustion ends up deteriorating.

Therefore, in the present embodiment, first, the processing of step 200 is performed to warm up the engine body. Note that the warmup of the engine body performed here is more specifically meant to raise the temperature of the top faces of the pistons 4 in a direct injection type engine like in the present embodiment. Further, in a port injection type engine, it is meant to raise the temperature of the intake ports and intake valves. Therefore, for example, in a direct injection type engine, when the temperatures of the top faces of the pistons 4 rise to a predetermined temperature or more and, in a port injection type engine, when the temperatures of the intake ports and intake valves rise to a predetermined temperature or more, the engine body is warmed up and the above engine body warmup processing is ended.

Figure 4:
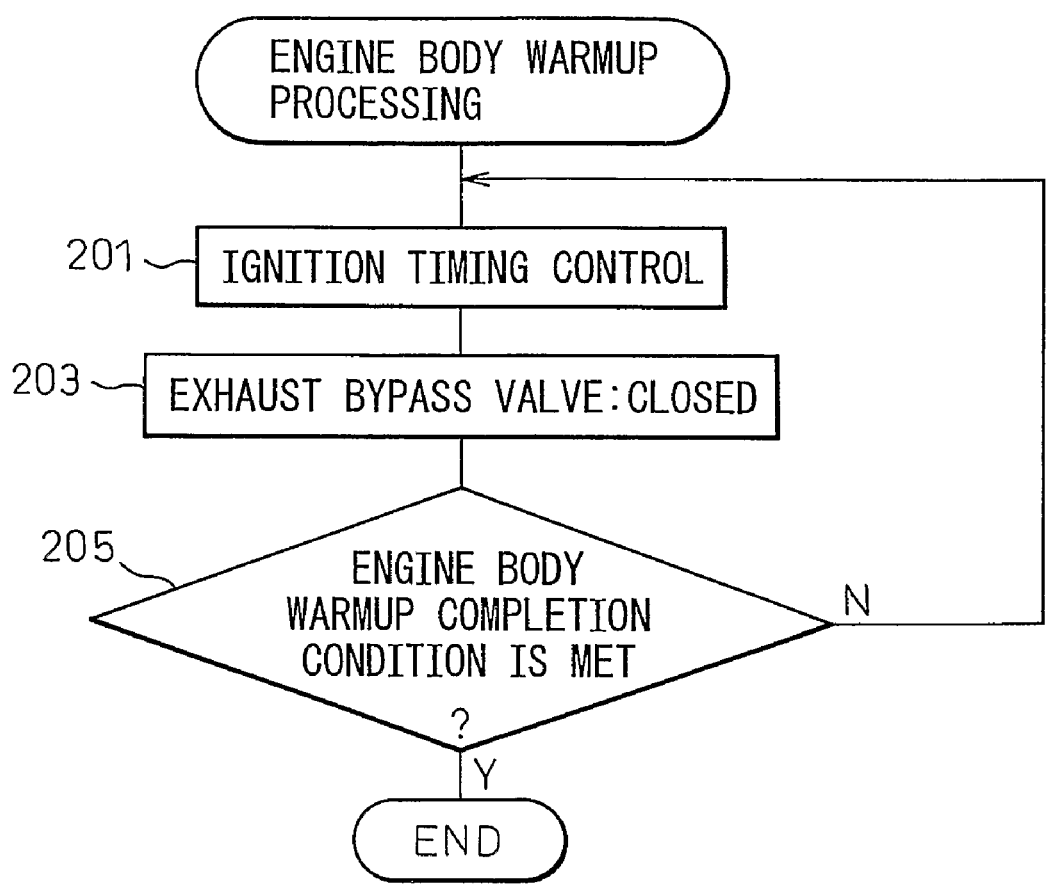
FIG. 4 is a flow chart of a control routine of engine body warmup processing executed at step 200 of FIG. 3.

FIG. 4 is a flow chart of the control routine of the engine body warmup processing executed at step 200. When the control routine starts, first, at step 201, the ignition timing Tf is controlled. The ignition timing control performed here retards the ignition timing Tf toward a predetermined target ignition timing Tfh. This target ignition timing Tfh is an ignition timing retarded to an extent where no deterioration of combustion occurs even if the engine body is not yet warmed up, preferably is an ignition timing in the case of retardation up to the limit in the range where no misfires occur. This ignition timing is found in advance by experiments etc. and is used as the target ignition timing Tfh. This target ignition timing Tfh is usually at the advanced side more than the above ignition timing Tfk (see FIG. 2).

When the above ignition timing retardation control is started at step 201, the routine proceeds to step 203. At step 203, the exhaust bypass valve 26 is closed. In the present embodiment, at the time of engine startup, the above exhaust bypass valve 26 is closed so, more specifically, the exhaust bypass valve 26 is kept closed. This is because, as explained above, when the ignition timing Tf is at the advanced side more than the ignition timing Tfk, if the exhaust bypass valve 26 is opened, the amount of HC Qhc becomes greater and the above-mentioned deterioration of emission ends up occurring. That is, by closing the exhaust bypass valve 26 here, priority is given to suppressing the above-mentioned deterioration of emission rather than early warmup of the catalysts.

After step 203, the routine proceeds to step 205. At step 205, it is judged if the condition for completion of engine body warmup is met. Here, the condition for completion of engine body warmup is that the engine body is in an engine warmup state where no misfires occur even if retarding the ignition timing Tf to the target ignition timing Tfj at the following step 300 (where this ignition timing Tfj is set to the retarded side more than the above ignition timing Tfk). This can in principle be defined, in a direct injection type engine, as the rise of the temperature of the top faces of the pistons 4 to a predetermined temperature or more and, further, in a port injection type engine, as the rise of the temperature of the intake ports and intake valves to a predetermined temperature or more.

In the present embodiment, the engine warmup state corresponding to the above condition for completion of the engine body warmup is expressed with reference to the intake pressure Pm. When the intake pressure Pm is an intake pressure Pme corresponding to the completion condition, it is judged that the condition for completion of engine body warmup is met. That is, in the present embodiment, the engine warmup state of the internal combustion engine body is judged based on the intake pressure. This is made possible because if the temperature of the internal combustion engine body (more specifically, in a direct injection type engine, the temperature of the top faces of the pistons 4, further, in a port injection type engine, the temperature of the intake ports and intake valves) Et rises, the temperature Gt of the exhaust gas rises; if the temperature Gt of the exhaust gas rises, the rotational speed Nt of the turbocharger turbine rises; if the rotational speed Nt of the turbocharger turbine rises, the intake pressure Pm rises; more specifically, these parameters are in a substantially proportional relationship ($Et \propto Gt \propto Nt \propto Pm$) Further, by using the intake pressure Pm in this way, it is possible to easily and accurately judge the engine warmup state of the internal combustion engine body. Note that a suitable value of the above intake pressure Pme is found in advance by experiment, etc.

When it is judged at step 205 that the condition for completion of engine body warmup does not hold, the routine returns to step 201 where this control routine is repeated. On the other hand, when it is judged that the condition for completion of engine body warmup is met, this control routine ends (that is, engine body warmup processing ends) and the routine proceeds to step 300 of the control routine of FIG. 3.

Figure 5:
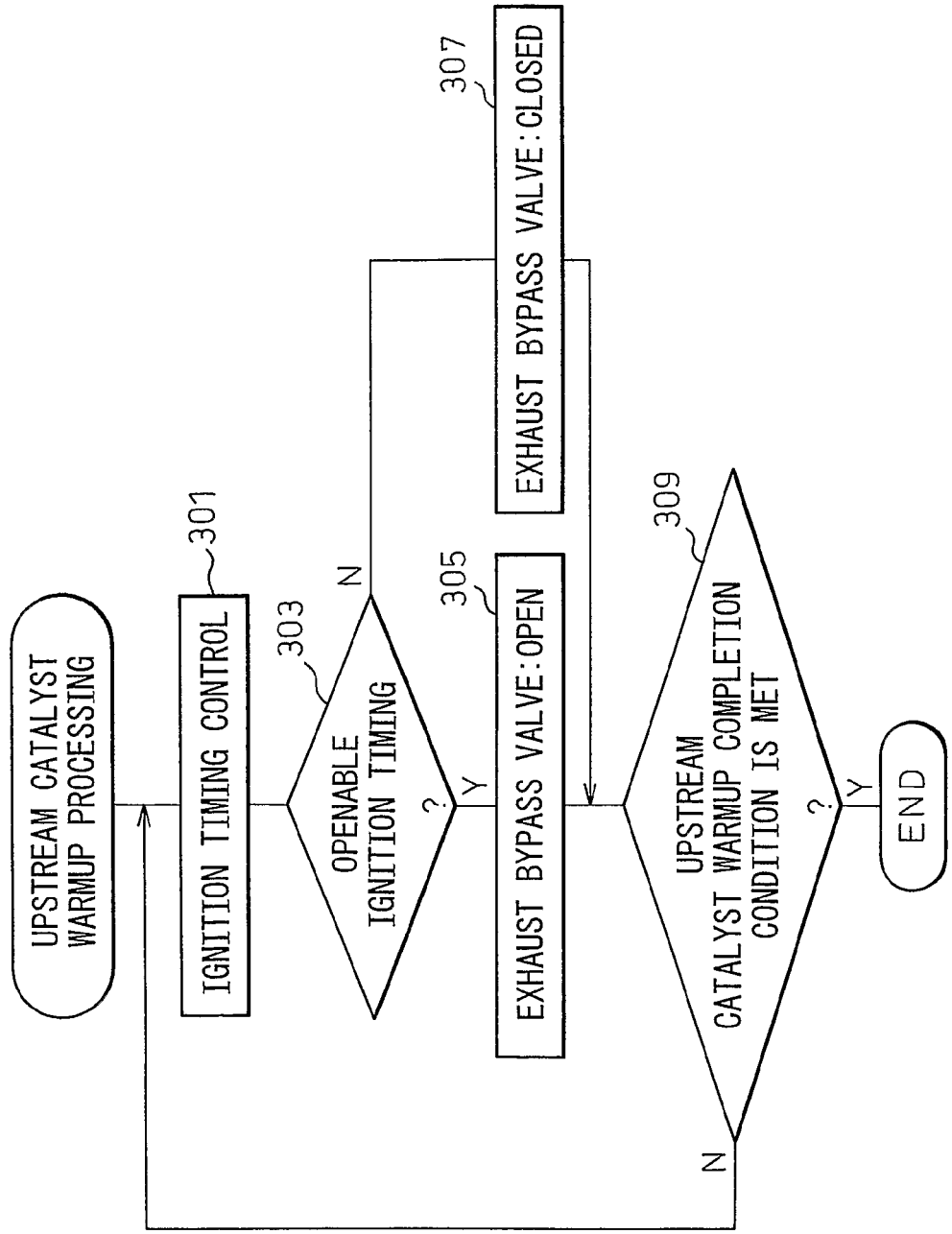
FIG. 5 is a flow chart of a control routine of upstream catalyst warmup processing executed at step 300 of FIG. 3.

At step 300, processing is executed for warming up the upstream catalyst 23 (upstream catalyst warmup processing). FIG. 5 is a flow chart of a control routine of an upstream catalyst warmup processing executed at step 300. When the control routine starts, first at step 301 the ignition timing Tf is controlled. The ignition timing control executed here retards the ignition timing Tf toward a predetermined target ignition timing Tfj. The target ignition timing Tfj here is at the retarded side more than the above ignition timing Tfk (see FIG. 2) and is set so as to have the above-mentioned relationship with the above condition for completion of engine body warmup.

When the above ignition timing retardation control is started at step 301, the routine proceeds to step 303. At step 303, it is judged if the ignition timing Tf at that time is an ignition timing enabling the exhaust bypass valve 26 to be opened. That is, it is judged if the ignition timing Tf at that time is equal to, or at the retarded side more than, the above ignition timing Tfk. That is, if the ignition timing Tf at that time is equal to, or at the retarded side more than, the above ignition timing Tfk, it is judged that the exhaust bypass valve 26 can be opened. If the ignition timing Tf at that time is at the advanced side more than the above ignition timing Tfk, it is judged that the exhaust bypass valve 26 cannot be opened.

When it is judged at step 303 that the exhaust bypass valve 26 can be opened, the routine proceeds to step 305 where the exhaust bypass valve 26 is opened. On the other hand, when it is judged at step 303 that the exhaust bypass valve 26 cannot be opened, the routine proceeds to step 307, where the exhaust bypass valve 26 is kept closed. Further, as is clear from the above explanation, by doing this, it is possible to reliably suppress deterioration of emission while promoting early warmup of the catalysts. Note that as explained above, the target ignition timing Tfj here is at the retarded side more than the above ignition timing Tfk, so when the ignition timing Tf is retarded to the above target ignition timing Tfj, the exhaust bypass valve 26 is opened.

After steps 305 and 307, the routine proceeds to step 309. At step 309, it is judged if the condition for completion of upstream catalyst warmup is met. Here, the condition for completion of upstream catalyst warmup is that the temperature of the upstream catalyst 23 rises to the activation temperature. In the present embodiment, this condition for completion of upstream catalyst warmup is expressed with reference to the cumulative value Ga of the amount of intake air from the current engine start. When this cumulative value Ga becomes a cumulative value Gaj of the amount of intake air corresponding to the completion condition or more, it is judged that the condition for completion of upstream catalyst warmup is met. That is, the above cumulative value Gaj is the cumulative value of the amount of air taken in until the temperature of the upstream catalyst 23 rises to the activated temperature from the cold start of the engine when the temperature of the upstream catalyst 23 is raised by the method in the present embodiment. This value Gaj is found in advance by experiment, etc.

When it is judged at step 309 that the condition for completion of upstream catalyst warmup is not met, the routine returns to step 301 from where this control routine is repeated. On the other hand, when it is judged that the condition for completion of upstream catalyst warmup is met, this control routine ends (that is, upstream catalyst warmup processing ends), and the routine proceeds to step 400 of the control routine of FIG. 3. Note that near when it is judged that the condition for completion of upstream catalyst warmup stands, the ignition timing Tf is retarded to the above target ignition timing Tfj. Therefore, normally, the routine proceeds to step 400 while the above exhaust bypass valve 26 is opened.

Figure 6:
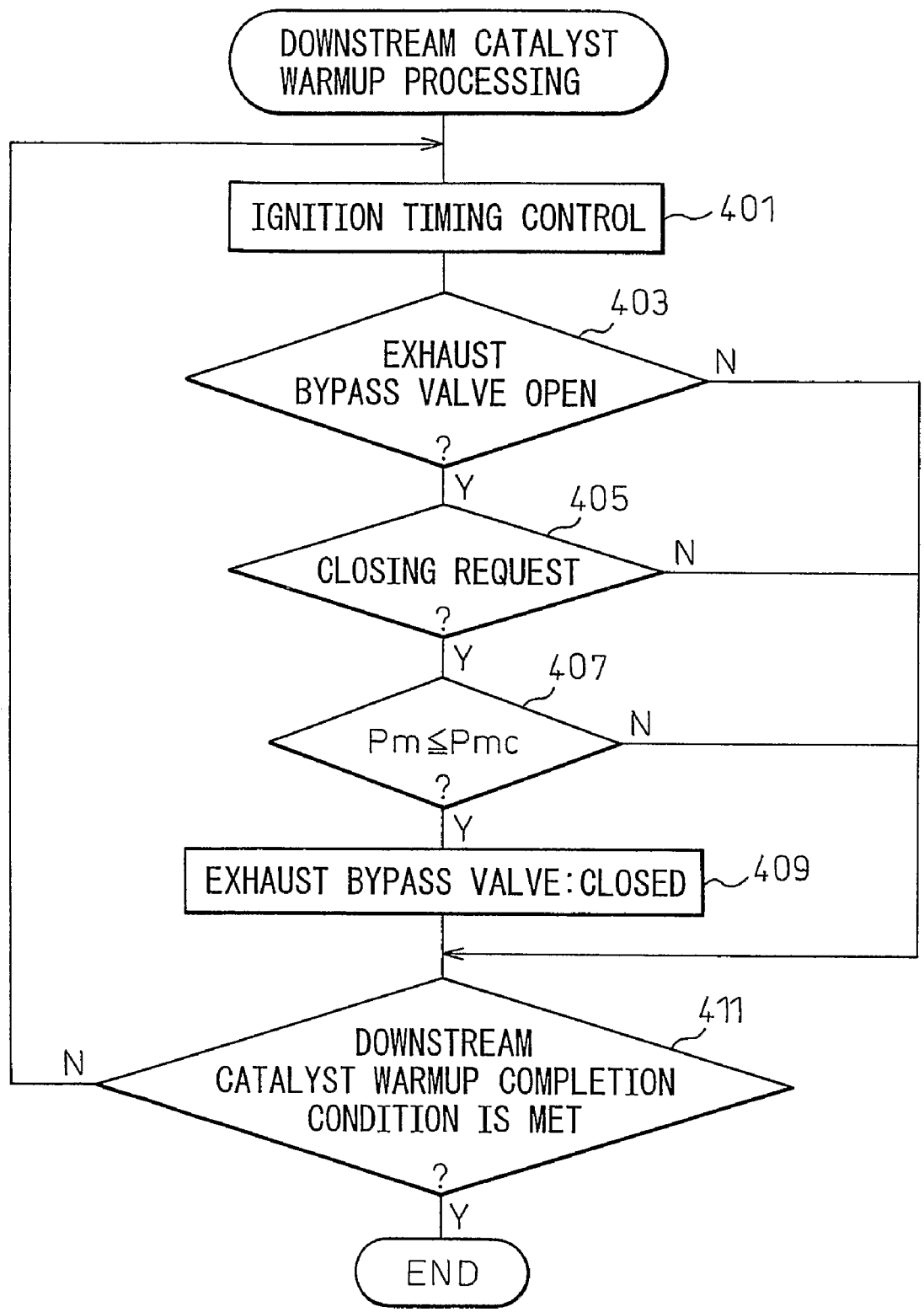
FIG. 6 is a flow chart of a control routine of downstream catalyst warmup processing executed at step 400 of FIG. 3.

At step 400, processing is performed for warming up the downstream catalyst 24 (downstream catalyst warmup processing). FIG. 6 is a flow chart of a control routine of the downstream catalyst warmup processing executed at step 400. When the control routine starts, first, at step 401, the ignition timing Tf is controlled. The ignition timing control executed here advances the ignition timing Tf toward the predetermined target ignition timing Tfe. The target ignition timing Tfe here is at the advanced side more than the above ignition timing Tfk. Further, usually, it is at the advanced side more than the above target ignition timing Tfh as well (see FIG. 2).

When the above ignition timing advance control is started at step 401, the routine proceeds to step 403. At step 403, it is judged if the exhaust bypass valve 26 is in the open state. When it is judged at step 403 that the exhaust bypass valve 26 is not in the open state, that is, is in the closed state, the routine proceeds to step 411. On the other hand, when it is judged at step 403 that the exhaust bypass valve 26 is in the open state, the routine proceeds to step 405. Note that, as explained above, normally, the routine proceeds to step 400 while the above exhaust bypass valve 26 is opened. Therefore, when the routine firstly proceeds to step 403, the exhaust bypass valve 26 is opened, then the routine proceeds to step 405.

When the routine proceeds to step 405, it is judged if there is a closing request of the exhaust bypass valve 26. This judges if the ignition timing Tf at that time is at the advanced side more than the ignition timing Tfk. That is, if the ignition timing Tf at that time is at the advanced side more than the above ignition timing Tfk, it is judged that there is a closing request of the exhaust bypass valve 26. If it is equal to, or at the retarded side more than, the ignition timing Tfk, it is judged that there is no closing request of the exhaust bypass valve 26. This judgment is made since, as explained above, when the ignition timing Tf is at the advanced side more than the ignition timing Tfk, opening of the exhaust bypass valve 26 increases the amount of HC Qhc, so for suppressing deterioration of the emission, it is better to close the exhaust bypass valve 26.

When it is judged at step 405 that there is a closing request of the exhaust bypass valve 26, the routine proceeds to step 407 while, when it is judged that there is no closing request of the exhaust bypass valve 26, the routine proceeds to step 411 in the state with the exhaust bypass valve 26 open. When the routine proceeds to step 407, it is judged if the intake pressure Pm is a predetermined intake pressure Pmc or less.

That is, in the present embodiment, when the advance control of the ignition timing Tf is started at the above step 401, the throttle valve 17 is controlled to the closed side so that the torque does not rise along with the advance of the ignition timing Tf. For this reason, the intake pressure Pm gradually falls and, at this step 407, it is judged if the intake pressure Pm becomes a predetermined intake pressure Pmc or less. Here, the above intake pressure Pmc is a low enough intake pressure Pm so that the intake pressure Pm is not affected even if the exhaust bypass valve 26 is closed and the rotational speed Nt of the turbine 21 of the turbocharger 14 rises, and is found in advance by experiments etc., considering this point.

When it is judged at step 407 that the intake pressure Pm at that time is the above intake pressure Pmc or less, the routine proceeds to step 409 where the above exhaust bypass valve 26 is closed. On the other hand, when it is judged at step 407 that the intake pressure Pm at that time is larger than the above intake pressure Pmc, the routine proceeds to step 411 while the exhaust bypass valve 26 is open. In the present embodiment, this control is performed to suppress the torque shock due to the closing of the exhaust bypass valve 26. That is, if the above exhaust bypass valve 26 is closed, the amount of the exhaust gas supplied to the turbine 21 of the turbocharger 14 is increased, so the rotational speed of the turbine rises. For this reason, when the exhaust bypass valve 26 is closed, the intake pressure rapidly rises and torque shock ends up occurring in some cases, but if making the intake pressure sufficiently low, even if the rotational speed of the turbine rises, the intake pressure is not affected much at all and as a result the torque is also not affected much at all. Here, the above exhaust bypass valve 26 is closed only when it is judged that the intake pressure Pm is the above intake pressure Pmc or less, so it is possible to suppress torque shock due to closing of the exhaust bypass valve 26.

When the routine proceeds from the above steps 403, 405, and 407 to step 411, it is judged if the condition for completion of downstream catalyst warmup is met. Here, the condition for completion of downstream catalyst warmup is that the temperature of the downstream catalyst 24 rises to the activation temperature. In the present embodiment, this condition for completion of downstream catalyst warmup, like the above-mentioned upstream catalyst warmup completion condition, is expressed with reference to the cumulative value Ga of the amount of intake air from the current engine start. When the cumulative value Ga becomes a cumulative value Gak of the amount of intake air corresponding to the completion condition or more, it is judged that the condition for completion of downstream catalyst warmup is met. That is, the above cumulative value Gak is the cumulative value of the amount of air taken in until the temperature of the downstream catalyst 24 rises to the activated temperature from a cold start of the engine when the temperature of the downstream catalyst 24 is raised by the method in the present embodiment. This value Gak is found in advance by experiment, etc.

When it is judged at step 411 that the condition for completion of downstream catalyst warmup is not met, the routine returns to step 401, from where this control routine is executed again. On the other hand, when it is judged that the condition for completion of downstream catalyst warmup is met, this control routine ends (that is, the downstream catalyst warmup processing ends). Due to this, the warmup control shown by the control routine of FIG. 3 ends.

FIG. 7 shows an example of the change along with time of the engine rotational speed Ne, ignition timing Tf, exhaust bypass valve opening degree (or opening/closing state) θb, exhaust gas temperature Gt, intake pressure Pm, throttle valve opening degree θt, and cumulative value Ga of the amount of intake air in the case that the above warmup control is executed. In this example, the interval from the time t1 to t2 corresponds to engine body warmup processing (step 200), the interval from the time t2 to t5 corresponds to the upstream catalyst warmup processing (step 300), and further the interval from the time t5 to t8 corresponds to the downstream catalyst warmup processing (step 300).

In this example, at the time t1, it is judged that the internal combustion engine is in the idling state after a cold start (step 100), then engine body warmup processing (step 200) is started. That is, from the time t1, ignition timing retardation control is started where the ignition timing Tf is retarded toward the above target ignition timing Tfh. After this, the ignition timing Tf is retarded to the target ignition timing Tfh. That ignition timing Tfh is maintained until the time t2. In the interval from the time t1 to t2, the above exhaust bypass valve 26 is maintained in the closed state. In the interval from the time t1 to t2, along with the rise of the temperature Gt of the exhaust gas, the rotational speed Nt of the turbocharger turbine rises, so the intake pressure Pm gradually rises. When at the time t2 the intake pressure Pm reaches the intake pressure Pme, it is judged that the engine body has entered the predetermined engine warmup state, that is, the condition for completion of engine body warmup is met, and the engine body warmup processing (step 200) ends, then the upstream catalyst warmup processing (step 300) is started.

When the upstream catalyst warmup processing (step 300) is started, ignition timing retardation control is started where the ignition timing Tf is retarded toward the above target ignition timing Tfj. Further, in this example, the ignition timing Tf is retarded to the above ignition timing Tfk at the time t3. If the ignition timing Tf is retarded to the above ignition timing Tfk, as explained above, in the present embodiment, it is judged that the above exhaust bypass valve 26 can be opened, so at the time t3, the above exhaust bypass valve 26 is opened. Due to this, the intake pressure Pm starts to decline.

After this, the ignition timing Tf is further retarded. At the time t4, it is retarded to the above target ignition timing Tfj. Further, the ignition timing Tfj is maintained up to the time t5. Note that from the time t2 to t4, to suppress the fall in torque along with the retardation of the ignition timing Tf, the throttle valve opening degree θt is made larger. At the time t5, the cumulative value Ga of the amount of intake air reaches the above cumulative value Gaj and the upstream catalyst warmup completion condition is met. Due to this, the upstream catalyst warmup processing (step 300) is ended, then the downstream catalyst warmup processing (step 400) is started.

When the downstream catalyst warmup processing (step 400) is started, ignition timing advance control is started where the ignition timing Tf is advanced toward the above target ignition timing Tfe. Further, in this example, the ignition timing Tf is advanced to the ignition timing Tfk at the time t6. As explained above, when the ignition timing Tf is advanced more than the above ignition timing Tfk, it is judged that there is a closing request for the above exhaust bypass valve 26. Therefore, when the time t6 is passed, it is judged that there is a closing request for the above exhaust bypass valve 26.

However, at the time of the time t6, the intake pressure Pm is larger than the above intake pressure Pmc, so the exhaust bypass valve 26 is kept open. Then the exhaust bypass valve 26 is closed when the intake pressure Pm falls to the above intake pressure Pmc at the time t7. Further, at the time t8, the cumulative value Ga of the amount of intake air reaches the above cumulative value Gak and the condition for completion of downstream catalyst warmup is met. Due to this, the downstream catalyst warmup processing (step 400) ends, and the warmup control as a whole ends. Note that from the time t5 to t8, to suppress the rise in torque along with the advance of the ignition timing Tf etc., the throttle valve opening degree θt is made smaller.

As explained above, in the present embodiment, until the completion of warmup of the internal combustion engine body and warmup of the catalyst, the ignition timing is controlled in accordance with at least one of the engine warmup state and the catalyst warmup state and the opening degree of the exhaust bypass valve is controlled based on the control of the ignition timing.

Further, more specifically, in the present embodiment, after startup of the internal combustion engine, until the internal combustion engine enters a predetermined engine warmup state, the ignition timing Tf is set to a timing advanced more than the above ignition timing Tfk and the above exhaust bypass valve 26 is closed. Further, after the internal combustion engine enters the predetermined engine warmup state, the ignition timing Tf is retarded to the above ignition timing Tfk or more and the above exhaust bypass valve 26 is opened. Further, as explained above, by doing this, it is possible to suppress deterioration of combustion while reliably suppressing deterioration of emission and promoting early warmup of the catalysts.

Further, in the present embodiment, the exhaust bypass valve 26 opened to warm up the catalysts is closed after making the intake pressure Pm the above intake pressure Pmc or less. Further, as explained above, by doing this, it is possible to suppress torque shock due to closing of the exhaust bypass valve 26.

Note that, in the above-mentioned embodiment, the ignition timing Tf is retarded to at least the ignition timing Tfk where the amount of HC Qhc is no longer affected by the opening/closing state of the exhaust bypass valve 26, then the above exhaust bypass valve 26 is opened, but in another embodiment, if the ignition timing Tf is retarded to the ignition timing Tfx set to the advanced side more than the ignition timing Tfk, the above exhaust bypass valve 26 may be opened. That is, instead of the ignition timing Tfk in the above-mentioned embodiment, it is possible to use the above ignition timing Tfx.

As explained above, the difference in amount of HC Qhc due to the opening/closing state of the above exhaust bypass valve 26 gradually becomes smaller if the ignition timing is retarded, so even if doing this, by suitably setting the ignition timing Tfx (for example, by setting the ignition timing Tfx relatively close to the above ignition timing Tfk), it is possible to obtain the effect of suppression of the deterioration of emission to a considerable extent and further possible to promote early warmup of the catalysts. Further, in this case, the amount of retardation of the ignition timing Tf becomes small, so the possibility of deterioration of combustion can be reduced.

Further, in another embodiment, in the control routine, it is also possible to delete the engine body warmup processing of step 200 of FIG. 3 and instead repeatedly retard the ignition timing Tf to the most retarded ignition timing where no misfires occur at that time at step 301 in the upstream catalyst warmup processing of step 300 so as to retard the timing to the above target ignition timing Tfj. In this case, substantially, engine body warmup processing is executed at this step 301.

While the invention has been described with reference to specific embodiments chosen for purpose of illustration, it should be apparent that numerous modifications could be made thereto by those skilled in the art without departing from the basic concept and scope of the invention.

The invention claimed is:

1. A control system for a supercharged internal combustion engine, the control system comprising:

a main exhaust passage that extends from an exhaust port of the internal combustion engine through a turbocharger turbine and further through a catalyst, an exhaust bypass passage that branches from the main exhaust passage at the upstream side of the turbocharger turbine, bypasses the turbocharger turbine, and merges with the main exhaust passage before the catalyst at a turbine downstream side, and an exhaust bypass valve provided in the exhaust bypass passage, wherein the control system controls an ignition timing in accordance with at least one of an engine warm-up state and a catalyst warm-up state, until warm-up of an internal combustion engine body and the catalyst is completed, and wherein the control system causes the exhaust bypass valve to open to warm-up the catalyst when the ignition timing of the internal combustion engine is retarded to a timing equal to or greater than a predetermined ignition timing.

2. The control system for a supercharged internal combustion engine as set forth in claim 1, wherein from the start of the above internal combustion engine to when said internal combustion engine enters the engine warm-up state, the ignition timing is advanced more than the predetermined ignition timing.

3. The control system for a supercharged internal combustion engine as set forth in claim 1, wherein after the start of the internal combustion engine, and said internal combustion engine body is in the engine warm-up state, the ignition timing is retarded to or more than the predetermined ignition timings and the exhaust bypass valve is opened.

4. The control system for a supercharged internal combustion engine as set forth in claim 1, wherein the engine warm-up state of the internal combustion engine body is determined based on an engine intake pressure.

5. The control system for a supercharged internal combustion engine as set forth in claim 1, wherein the exhaust bypass valve is closed after an engine intake pressure is equal or less than a predetermined intake pressure.

6. A control system for a supercharged internal combustion engine, the control system comprising:

a main exhaust passage that extends from an exhaust port of the internal combustion engine through a turbocharger turbine and further through a catalyst, an exhaust bypass passage that branches from the main exhaust passage at the upstream side of the turbocharger turbine, bypasses the turbocharger turbine, and merges with the main exhaust passage before the catalyst at a turbine downstream side, and an exhaust bypass valve that opens and closes the exhaust bypass passage, wherein the control system opens the exhaust bypass valve to warm-up the catalyst after startup of the internal combustion engine when an ignition timing of the internal combustion engine is retarded to a timing equal to or greater than a predetermined ignition timing.

7. The control system for a supercharged internal combustion engine as set forth in claim 6, wherein from the start of the above internal combustion engine to when said internal combustion engine enters an engine warm-up state, the ignition timing is advanced more than the predetermined ignition timing.

8. The control system for a supercharged internal combustion engine as set forth in claim 6, wherein after the start of the internal combustion engine, and said internal combustion engine body is in an engine warm-up state, the ignition timing is retarded to or more than the predetermined ignition timing, and the exhaust bypass valve is opened.

9. The control system for a supercharged internal combustion engine as set forth in claim 6, wherein the engine warm-up state of the internal combustion engine body is determined based on an engine intake pressure.

10. The control system for a supercharged internal combustion engine as set forth in claim 6, wherein the exhaust bypass valve is closed after an engine intake pressure is equal or less than a predetermined intake pressure.

11. The control system for a supercharged internal combustion engine as set forth in claim 1, wherein the engine warm-up state of the internal combustion engine body is determined based on a temperature of a top face of an engine piston.

12. The control system for a supercharged internal combustion engine as set forth in claim 6, wherein the engine warm-up state of the internal combustion engine body is determined based on a temperature of a top face of an engine piston.

* * * * *

UNITED STATES PATENT AND TRADEMARK OFFICE
CERTIFICATE OF CORRECTION

| | | |
|---|---|---|
| PATENT NO. | : 7,614,229 B2 | Page 1 of 1 |
| APPLICATION NO. | : 11/666441 | |
| DATED | : November 10, 2009 | |
| INVENTOR(S) | : Irisawa et al. | |

It is certified that error appears in the above-identified patent and that said Letters Patent is hereby corrected as shown below:

On the title page, Item (86), the PCT information is incorrect. Item (86) should read:
-- (86) PCT No.: PCT/JP2006/310500

§ 371 (c) (1),
(2), (4) Date: Apr. 27, 2007 --

Signed and Sealed this

Fifth Day of January, 2010

David J. Kappos
*Director of the United States Patent and Trademark Office*